(12) United States Patent
Smith et al.

(10) Patent No.: US 9,178,456 B2
(45) Date of Patent: Nov. 3, 2015

(54) POWER TRANSMISSION SYSTEMS

(75) Inventors: Christopher Alan Smith, Leicester (GB); Matthew James Moreman, Worcestershire (GB); Leonard William Burt, Warwickshire (GB); Matthew James Cunningham, Leicestershire (GB)

(73) Assignee: GE ENERGY POWER CONVERSION TECHNOLOGY, LTD. (GB)

( * ) Notice: Subject to any disclaimer, the term of this patent is extended or adjusted under 35 U.S.C. 154(b) by 593 days.

(21) Appl. No.: 13/638,766

(22) PCT Filed: Apr. 4, 2011

(86) PCT No.: PCT/EP2011/001672
§ 371 (c)(1),
(2), (4) Date: Jan. 15, 2013

(87) PCT Pub. No.: WO2011/124355
PCT Pub. Date: Oct. 13, 2011

(65) Prior Publication Data
US 2013/0200617 A1    Aug. 8, 2013

(30) Foreign Application Priority Data

Apr. 6, 2010 (EP) .................................... 10036912

(51) Int. Cl.
*H02J 3/00* (2006.01)
*H02P 9/02* (2006.01)
*H02P 9/10* (2006.01)
*H02J 3/38* (2006.01)
*H02P 9/00* (2006.01)

(52) U.S. Cl.
CPC . *H02P 9/02* (2013.01); *H02J 3/382* (2013.01); *H02P 9/102* (2013.01); *H02P 9/007* (2013.01); *Y02E 10/763* (2013.01)

(58) Field of Classification Search
CPC ............. H02J 3/382; H02J 9/02; H02J 9/102; H02P 9/007; Y02E 10/763
USPC .......................................................... 307/84
See application file for complete search history.

(56) References Cited

U.S. PATENT DOCUMENTS

2007/0085343 A1    4/2007   Fortmann

FOREIGN PATENT DOCUMENTS

| WO | 00 73652 A1 | 12/2000 |
| WO | 2009 082204 A1 | 7/2009 |
| WO | 2010 002402 A1 | 1/2010 |

*Primary Examiner* — Hal Kaplan
(74) *Attorney, Agent, or Firm* — Parks Wood LLC

(57) ABSTRACT

A power transmission system may include a plurality of renewable-energy devices such as wind turbines or subsea turbines. The devices are connected together in parallel to a subsea cable that carries an ac transmission voltage. Each device includes a turbine assembly that is rotated by wind or water current flows, and a variable speed ac induction generator. A power converter is connected to the subsea cable and is used to interface the generators to a supply network or power grid. The power transmission system is operated such that an indicated operating speed of one or more of the devices is used to control the power converter (e.g. the PWM strategy that is used to open and close the power semiconductor devices) to achieve desired stator electrical quantities at each generator.

16 Claims, 2 Drawing Sheets

POWER TRANSMISSION SYSTEMS

FIELD OF THE INVENTION

The present invention relates to power transmission systems, and in particular to power transmission systems that can be used to interface renewable-energy turbines to a power grid or supply network with a nominally fixed voltage and frequency. The power transmission system can optionally include features for grid fault ride-through and energy storage.

BACKGROUND OF THE INVENTION

It is possible to convert renewable energy such as wind, wave, tidal energy or water current flows into electrical energy by using a turbine to drive the rotor of a generator, either directly or by means of a gearbox. The ac frequency that is developed at the stator terminals of the generator (the "stator voltage") is directly proportional to the speed of rotation of the rotor. The voltage at the generator terminals also varies as a function of speed and, depending on the particular type of generator, on the flux level. For optimum energy capture, the speed of rotation of the output shaft of the renewable-energy turbine will vary according to the speed of the wind or water current flows driving the blades of the turbine assembly. Matching of the variable voltage and frequency of the generator to the nominally constant voltage and frequency of the power network can be achieved by using a power converter.

The efficiency of a turbine is usually expressed by a Cp-Lambda curve. In a given cross section through a fluid flow, there is an amount of power present given by the flow rate and the kinetic energy per unit volume that it contains. Cp represents the efficiency of the turbine in converting this power into mechanical power. Lambda is the turbine blade tip speed divided by fluid flow rate.

SUMMARY OF THE INVENTION

The present invention provides a power transmission system that can be used to supply power generated by renewable-energy turbines to a supply network or power grid. The power transmission system comprises: a plurality of renewable-energy turbines connected in parallel to a power converter, each renewable-energy turbine including a turbine assembly and an induction generator; and a controller for the power converter; wherein the controller uses: (i) an indication of the operating speed of one or more of the renewable-energy turbines, and/or (ii) an indication of the speed of the fluid flows that are acting on the turbine assemblies, to control the power converter to achieve desired stator electrical quantities at each induction generator. The term "stator electrical quantities" is used herein to refer to any and all of the individual phase voltage magnitude, individual phase current magnitude, magnetic flux, phase and frequency in the induction generators. However, the stator electrical quantities that are most typically controlled are the stator voltage and the stator frequency.

The controller may control the power converter to achieve desired stator electrical quantities at each induction generator, for example control the stator voltage, to keep the renewable-energy turbines operating substantially at their maximum efficiency, i.e. to stay on the peak of the efficiency (Cp) curve of the turbine assemblies.

The induction generators may have any suitable construction such as a squirrel cage type, for example.

Any convenient number of renewable-energy turbines may be present. The renewable-energy turbines may be part of an onshore or offshore wind farm that generates electrical energy from wind flows, or a wave farm or subsea turbine farm, for example. It will be readily appreciated that subsea turbines that generate electrical energy from tidal flows and water current flows may be either partially or completely located in any body of water including oceans, seas, tidal estuaries, rivers and other waterways etc. A major advantage of the power transmission system is that the equipment that is placed on the seabed or underwater is minimised.

The induction generators may be connected to the power converter by a single transmission cable. However, each induction generator may be connected to the power converter by its own transmission cable.

The transmission cable(s) may be of any suitable type and where necessary may be specifically designed to be suitable for subsea (or offshore) use. For example, the subsea cable may be capable of carrying high or medium transmission voltages and may use crosslinked polyethylene (XLPE) insulation. The transmission cable(s) may consist of a plurality of main power cables (typically three single-core cables for a three-phase ac transmission system or a single cable with three cores) together with a plurality of auxiliary power cables and optical fibres for data transmission. The main power cables may be specifically designed to carry the power generated by the renewable-energy turbines and are rated at least to the desired ac transmission voltage. The auxiliary power cables may be used to supply power to the turbines for the purpose of powering auxiliary loads etc. The power that is supplied to the turbines may be conveniently derived from a connection between the power converter and the supply network or power grid (typically on the network-side of a step-up transformer that is electrically connected between the power converter and the supply network) and can be provided by means of an auxiliary switchboard. However, the power that is supplied to the turbines may be derived from any suitable or convenient source.

The power converter can be electrically connected to the transmission cable(s) by means of a step-down transformer.

The power converter can have any suitable topology or construction as long it is capable of being operated in accordance with the control strategies of the present invention to achieve the desired stator electrical quantities at each induction generator.

In one arrangement the power converter may include: a first active rectifier/inverter electrically connected to the transmission cable(s) (optionally by means of the step-down transformer mentioned above) having a plurality of semiconductor power switching devices, a second active rectifier/inverter having a plurality of semiconductor power switching devices, and a dc link connected between the first active rectifier/inverter and the second active rectifier/inverter. In this case, it will typically be the first active rectifier/inverter (or machine bridge) that is controlled to achieve the desired stator electrical quantities. The first and second rectifier/inverters can have any suitable topology. In normal operation the first active rectifier/inverter will operate as a rectifier and the second active rectifier/inverter (or network bridge) will operate as an inverter. However, in some circumstances it might be useful to supply power from the supply network to the induction generators so that they can operate in a motoring mode. In this case, the power converter will be designed to cope with bi-directional power flow and the second active rectifier/inverter will operate as a rectifier and the first active rectifier/inverter will operate as an inverter. The operation of the semiconductor power switching devices in the first active rectifier/inverter can be controlled using gate drive control signals derived in accordance with a conventional pulse width modulation (PWM) strategy.

Other types of possible power converter would include a cycloconverter or matrix converter, for example.

A dump resistor can be electrically connected to the dc link, optionally by means of a suitable power converter. The dump resistor provides a grid fault ride-through capability.

An energy storage device can be electrically connected to the dc link, optionally by means of a suitable power converter. Possible energy storage devices would include super-capacitors, batteries, flow cells and inertial devices (e.g. flywheels).

A step-up transformer can be electrically connected between the power converter and a supply network. The step-down and step-up transformers may have any suitable topology.

The power converter may be electrically connected to the step-down and step-up transformers, respectively, by means of protective switchgear. This enables the power converter to be isolated from both the induction generators and the supply network or power grid.

The turbine assembly of each renewable-energy turbine can have any number of blades or other suitable aerofoil construction such that it is rotated by fluid flows. The turbine assembly is connected to the rotor of the induction generator either directly or by means of a gearbox. Each induction generator may be connected to the transmission cable by means of protective switchgear so that it can be isolated in the event of a fault or for maintenance or repair.

It will be readily appreciated that because the turbine assembly of each renewable-energy turbine is connected to the rotor of the associated induction generator (either directly or by means of an optional gearbox) then the respective operating speeds will be directly linked or proportional to each other. In other words, if the operating speed of the turbine assembly increases as a result of an increase in fluid flow speed then the operating speed of the induction generator (or the shaft speed) will also increase. Any reference herein to the operating speed of the turbine may therefore be taken to be the operating speed of the turbine assembly or the operating speed of the induction generator unless otherwise stated.

The indication of the operating speed of a renewable-energy turbine that is optionally used by the power converter controller may be derived in a number of different ways. For example, the operating speed of an induction generator may be estimated by an associated encoder or speed sensor that measures rotor speed. Alternatively, the operating speed of an induction generator may be estimated or calculated from the stator frequency and slip frequency. The slip frequency represents the relative motion between the rotating field and the rotor of the induction generator and can be calculated from the stator voltage, stator frequency, stator current and knowledge of the generator parameters. The optimum operating speed of a turbine assembly may be estimated from the speed of the fluid flows that are acting on the turbine assembly, and this optimum speed command can be used by the power converter to regulate the actual speed of the turbine assembly by setting the electrical frequency of the machine inverter voltage appropriately. The optimum operating speed of the turbine assembly may alternatively be calculated from shaft speed, generator power and the properties of the turbine assembly, for example.

The indication of the fluid flow speed that is optionally used by the power converter controller may also be derived in a number of different ways. It may be measured directly by a speed sensor that is local to the turbine assemblies or estimated or calculated from the generator power, generator speed and the Cp-Lambda curve for the associated turbine assembly, for example.

The power converter can be located onshore, offshore on a fixed or floating platform such as an oil and gas rig, or subsea.

Since the plurality of renewable-energy turbines are connected to the power converter in parallel the individual induction generators cannot be controlled independently. As a result, the induction generators will require stator electrical quantities (and in particular a stator voltage and a stator frequency) that are matched to an operating speed of one or more of the turbines at any given time. A suitable stator voltage and stator frequency for the induction generators can be determined by the power converter when it is operated in accordance with a suitable control strategy.

The controller may use an average of the estimated operating speeds of all of the renewable-energy turbines or the estimated operating speed of just one of the turbines to calculate the desired stator electrical quantities and control the power converter in such a way to achieve them. For example, the slip speed of all the induction generators could be calculated and the stator voltage and stator frequency set to ensure that the most heavily loaded induction generator does not exceed its maximum torque.

The controller preferably uses a control strategy (optionally one based on variable voltage variable frequency (VVVF) control or vector control, for example) to automatically control the power converter to achieve the desired stator electrical quantities at each induction generator based on an indicated operating speed of one or more of the induction generators and/or an indicated operating speed of the fluid flows acting on one or more of the turbine assemblies. In one arrangement the stator voltage is controlled to achieve optimum flux in the induction generators at low operating speeds. Once the induction generators are indicated to be running at their rated speed then the stator voltage is controlled to be substantially constant and preferably at a magnitude that fully utilises the rating of the power converter.

It will be readily appreciated that the stator frequency should increase as the operating speed of the induction generators increases. Thus, in high flow conditions where the available turbine power exceeds the rating of the associated induction generator the operating speed of the induction generator will increase in accordance with the proposed control strategy until the turbine power has fallen by virtue of the increased speed and the Cp-lambda curve. Eventually, a stable point can be reached where the turbine power is less than the power that can be collected by the induction generator. The use of the proposed control strategy therefore means that the renewable-energy turbines do not need to have pitch control or stall regulation. The turbines also do not require any means to shed power at high flow rates.

Cp depends on Lambda and the Cp-Lambda curve usually takes the form of an inverted parabola having a peak value at the optimum Lambda. The shape of the Cp-Lambda curve does not change greatly with fluid flow speed so that the optimum blade tip speed increases linearly with flow rate. In the present invention, when the fluid flow speed and the optimum Cp gives more power than the generator is rated for, the turbine blade tip speed and Lambda are allowed to increase so that Cp falls. Cp will always reach zero at some value of Lambda. The importance of this approach is that the induction generator of the renewable-energy turbine can be rated at the economic optimum power and not at the power that might be achieved only infrequently. It will be readily appreciated that the fluid flow speed cannot be controlled—although there will normally be statistical data on which the design of the renewable-energy turbine can be based. It is also important to note that with the control strategy of the present invention rated power will still be developed when the fluid flow speed is above the speed that is sufficient to achieve rated power.

The indicated operating speed of the one or more renewable-energy turbines can be used as a pointer to a look-up table that is then used by the controller to set the desired stator voltage and stator frequency by appropriate control of the power converter. If the indicated operating speed is zero then the stator voltage and stator frequency are both zero or close to zero. As the indicated operating speed increases then the stator voltage and stator frequency also increases according to a predetermined relationship. The non-linear relationship between operating speed, stator voltage and stator frequency is defined by the design parameters of the induction generators. But the optimum stator frequency depends on the fluid flow speed and the Cp-Lambda curve of the turbine assembly. This means that the shaft speed is normally kept proportional to fluid flow speed until the rated speed of the induction generator is reached. Once the indicated operating speed reaches the rated speed for the induction generators (i.e. the indicated operating speed reaches a predetermined threshold) then the stator voltage is preferably kept substantially constant, typically at the rated voltage. In other words, if the indicated operating speed increases above the rated speed or predetermined threshold then there is no significant increase in the stator voltage. It will be readily appreciated that some small increase in stator voltage can be permitted within the voltage limit of the power converter and the voltage drop in the transmission cable(s). Stator frequency will continue to increase as fluid flow speed, and hence turbine assembly and shaft speed, increase. If the indicated operating speed falls below the rated speed for the induction generators then the stator voltage and stator frequency are decreased according to the same predetermined relationship.

The design rating for the induction generators is defined in terms of operating speed, stator voltage and stator frequency and is completely independent of the prevailing voltage and frequency of the supply network or power grid.

In practice the flow speed at a given location will vary and it is necessary to consider both the highest flow speed and the average flow speed. The average fluid flow speed can be used in various ways to determine the most economic optimum power rating for the induction generators. An advantage of the proposed control strategy is that the power rating of the induction generators only has to be designed for the fluid flow speed that is equivalent to the most economic optimum power rating and not the power rating that is equivalent to maximum flow speed conditions.

The present invention further provides a method of operating a power transmission system comprising: a plurality of renewable-energy turbines connected in parallel to a power converter, each renewable-energy turbine including a turbine assembly and an induction generator; the method comprising the step of using: (i) an indication of the operating speed of one or more of the renewable-energy turbines, and/or (ii) an indication of the speed of the fluid flows acting on the turbine assemblies, to control the power converter to achieve desired stator electrical quantities at each induction generator, optionally to keep the renewable-energy turbines operating substantially at their maximum efficiency.

Each induction generator can be protected against overspeed by appropriate proportioning of the Cp-Lambda curve so that the power developed by the turbine assembly falls to zero before the shaft speed exceeds the maximum rated shaft speed of the induction generator. Furthermore, by using the method of the present invention, each induction generator can develop useful power even when the shaft speed exceeds the speed at which full power can be extracted.

BRIEF DESCRIPTION OF THE DRAWINGS

Exemplary embodiments of the invention will now be described with reference to the accompanying drawings, in which.

DETAILED DESCRIPTION OF THE PREFERRED EMBODIMENTS

Figure 1:
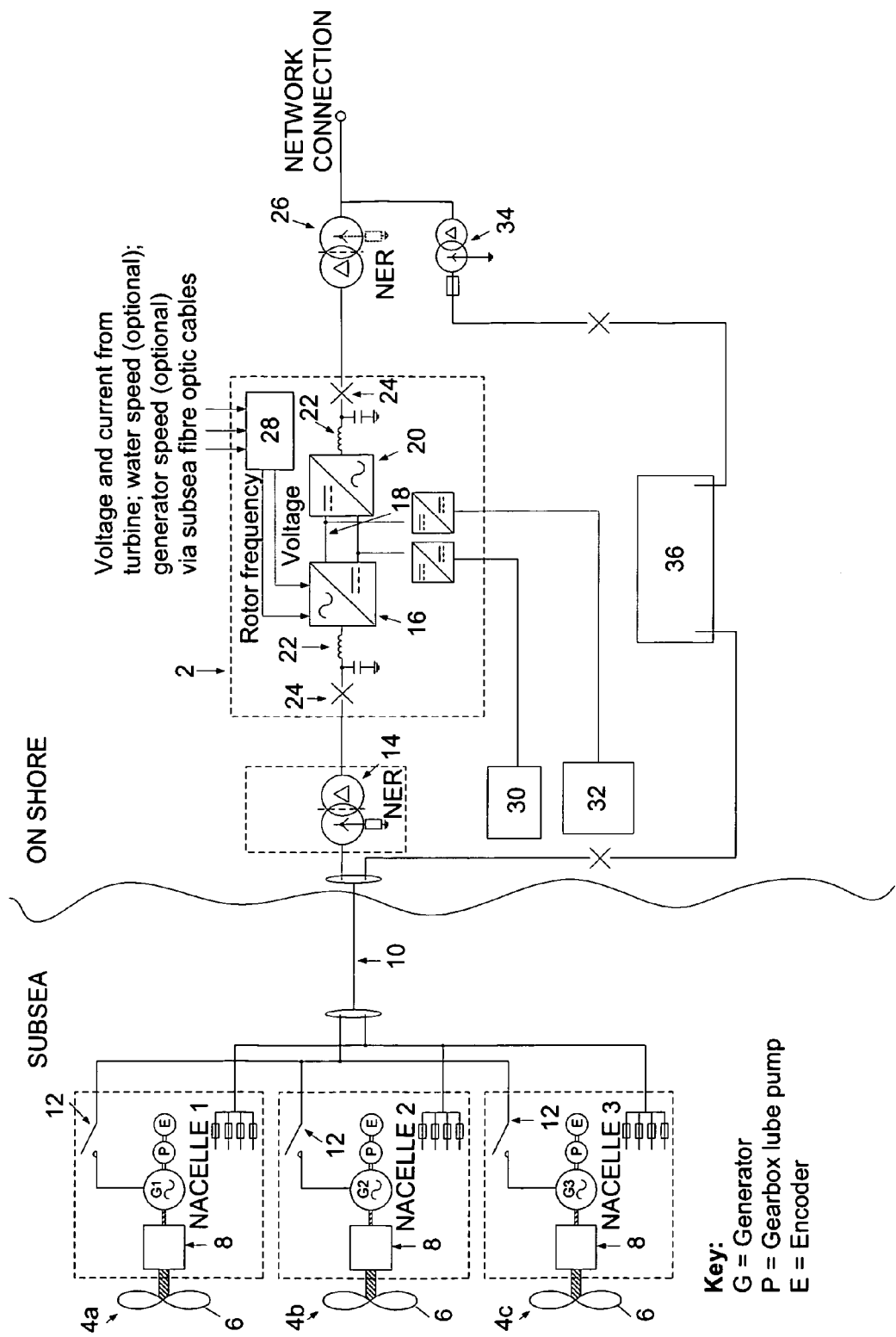
FIG. 1 is a schematic diagram showing a power transmission system according to the present invention.

The basic topology of the power transmission system will be outlined with reference to FIG. 1. Although the system is described in more detail in the context of a subsea turbine farm, it will be readily appreciated that it can be used for other renewable-energy turbines such as wind turbines or wave turbines, for example.

A power converter 2 is used to interface between a plurality of variable speed ac induction generators G1, G2 and G3 and a nominally fixed frequency supply network or power grid. Each induction generator G1, G2 and G3 forms part of a subsea turbine 4a, 4b and 4c. In the basic topology shown in FIG. 1 three subsea turbines 4a, 4b, 4c are shown to be connected together to define a subsea turbine farm. However, in practice it will be readily appreciated that the power transmission system can be used with any convenient number of subsea turbines, each having an induction generator.

Each subsea turbine typically includes a turbine assembly 6 with any suitable number of blades mounted on a rotating shaft. A gearbox 8 (which in some configurations would be optional) is used to connect the rotating shaft of the turbine assembly 6 to the rotor of the induction generator G1, G2 and G3. A gearbox lubrication pump P is mechanically connected to each generator and is used to pump a suitable lubricant (e.g. oil) through the gearbox 8. A speed transducer E provides an estimate of the rotation speed of the generator rotor and may have any suitable construction (e.g. an encoder or tacho). The gearbox, generator, gearbox lubrication pump and encoder are located within a suitably-shaped nacelle.

The stator terminals of each generator G1, G2 and G3 are connected in parallel to the main power cables of a subsea cable 10. More particularly, the subsea cable 10 includes three main power cables (one for each ac phase or a single power cable with three cores), three auxiliary power cables which enable power to be supplied to auxiliary loads at each subsea turbine and any convenient number of fibre optic cables for data transmission. In other configurations then different numbers of main power cables and auxiliary power cables can be used.

Each generator G1, G2 and G3 is connected to the main power cables of the subsea cable 10 by means of protective switchgear 12 that enable it to be isolated from the rest of the power transmission system.

The main power cables of the subsea cable 10 are connected to the power converter 2 by means of a step-down transformer 14. In FIG. 1 the step-down transformer 14 is shown to have star (or wye) primary windings and delta secondary windings but other constructions are possible. A neutral earthing resister (NER) is used for the neutral earthing of the primary windings. The subsea cable 10 is designed to carry a transmission voltage (e.g. 11 kV, 13 kV or 33 kV; 50

Hz) and the transformer steps this input voltage down to a convenient output voltage (e.g. 0.69 kV, 0.9 kV or 3.3 kV) which is then provided to the power converter 2.

The secondary windings of the step-down transformer 14 are connected to the ac terminals of a three-phase machine bridge 16 which in normal operation operates as an active rectifier to supply power to a dc link 18. The step-down transformer 14 is optional. It will typically be provided in power transmission systems with a long subsea cable where it is essential to have a high transmission voltage. It may not be economic to provide the step-down transformer on power transmission systems with a shorter subsea cable. In such systems, there may not even be a single subsea cable, but rather a number of subsea cables, one from the induction generator of each turbine to the machine bridge 16.

The machine bridge 16 has a conventional three-phase two-level topology with a series of semiconductor power switching devices fully controlled and regulated using a pulse width modulation strategy. However, in practice the machine bridge can have any suitable topology such a three-level neutral point clamped topology or a multi-level topology (Foch-Maynard arrangement, for example).

The dc output voltage of the machine bridge 16 is fed to the dc terminals of a network bridge 20 which in normal operation operates as an inverter. The network bridge 20 has a similar three-phase two-level topology to the machine bridge with a series of semiconductor power switching devices fully controlled and regulated using a pulse width modulation strategy. However, in practice the network bridge can have any suitable topology, as discussed above for the machine bridge.

As described herein, active rectification (as the prime mode of operation of the machine bridge 16) is the conversion of energy from the ac terminals of the three-phase machine bridge to the dc link and inversion (as the prime mode of operation of the network bridge 20) is the conversion of energy from the dc link of the three-phase network bridge to its ac terminals. However, it will be readily appreciated that there may be times when it might be necessary or desirable to operate the machine bridge 16 as an inverter and operate the network bridge 20 as an active rectifier. For example, during start-up of the subsea turbines 4a, 4b and 4c the network bridge 20 may operate as an active rectifier to supply power from the supply network to the dc link 18. It can also be advantageous for maintenance purposes and when the subsea turbines 4a, 4b and 4c are operating at very low speeds to operate the generators G1, G2 and G3 in a motoring mode. In this case, power can be supplied from the supply network to the generators through the network bridge 20 operating as an active rectifier and the machine bridge 16 operating as an inverter.

The ac input voltage to the machine bridge 16 and the ac output voltage from the network bridge 20 is filtered by suitable filter arrangements 22. The filter arrangements 22 are primarily to remove pulse with modulation (PWM) voltage content, but can offer power factor correction if required to balance the impedance of the transmission cable 10. Protective switchgear 24 is included to provide a reliable connection to the step-down transformer 14 and the supply network and to isolate the power converter 2 from the power network for various operational and non-operational requirements.

The ac output voltage of the network bridge 20 is supplied to the nominally fixed frequency supply network by means of a step-up transformer 26. In FIG. 1 the step-down transformer 26 is shown to have delta primary windings and star (or wye) secondary windings but other constructions are possible. A neutral earthing resister (NER) is used for the neutral earthing of the secondary windings, but may be omitted if a direct connection to the supply network is provided. The transformer 26 steps up the input voltage to an output voltage that matches the nominally fixed transmission voltage of the supply network or power grid.

The machine bridge 16 is operated under the control of a machine bridge controller 28. The machine bridge controller 28 uses various data inputs to derive the gate drive command signals that are used to control the semiconductor power switching devices of the machine bridge 16. In this manner, the machine bridge controller 28 can control the machine bridge 16 to achieve the desired stator voltage and stator frequency for the induction generators G1, G2 and G3.

Shaft speed information from the speed transducers E is provided to the machine bridge controller 28 through the fibre optic cables that form an integrated part of the subsea cable 10. More particularly, the subsea cable 10 will carry data signals such as individual generator voltage, current, power factor, or perhaps even direct measurements of ac voltage and current. The machine bridge controller 28 can also use a measurement of the water speed.

An energy storage device 30 such as a supercapacitor is optionally connected to the dc link 18 of the power converter and can be used to store excess power that is not supplied to the supply network or power grid.

A dump resistor 32 and switching device (chopper) is also optionally connected to the dc link 18 of the power converter to provide a grid fault ride-through capability. The machine bridge 16 uses voltage transducers to identify low voltage on the output terminals of the network bridge 20. Such a low voltage might commonly be referred to as a grid fault. As active power export is limiting during the grid fault, the dc link voltage will rise and the dump resistor current is controlled to regulate the dc voltage.

Power is supplied to auxiliary loads at each subsea turbine 4a, 4b and 4c through the auxiliary power cables of the subsea cable 10. The power can be conveniently derived from the output voltage of the step-up transformer 26. As shown in FIG. 1, an auxiliary step-down transformer 34 having delta primary windings connected between the step-up transformer 26 and the supply network and star (or wye) secondary windings is connected to the auxiliary power cables by means of an auxiliary switchboard 36. Other electrical loads may be connected to the auxiliary switchboard 36, which may also employ an uninterruptable power supply (UPS).

One possible control strategy will now be described with reference to FIG. 2, which shows the relationship between the operating speed of an induction generator and its stator voltage and stator frequency.

The indicated operating speed of the induction generators G1, G2 and G3 is measured by the speed transducers E and the shaft speed information is supplied to the machine bridge controller 28 by means of the fibre optical cables. An average of the indicated operating speeds is calculated and used as a pointer to a non-linear look-up table to determine a desired stator voltage. A speed transducer can be used to compare the slip speed on each induction generator and as such determine if any of the generators is about to exceed its torque capability. However, a speed transducer is not essential to the basic operation of the power transmission system if the subsea turbines are equally loaded. The indicated operating speed (or shaft speed) of the induction generators can be determined from the stator frequency and the generator slip speed.

Figure 2:
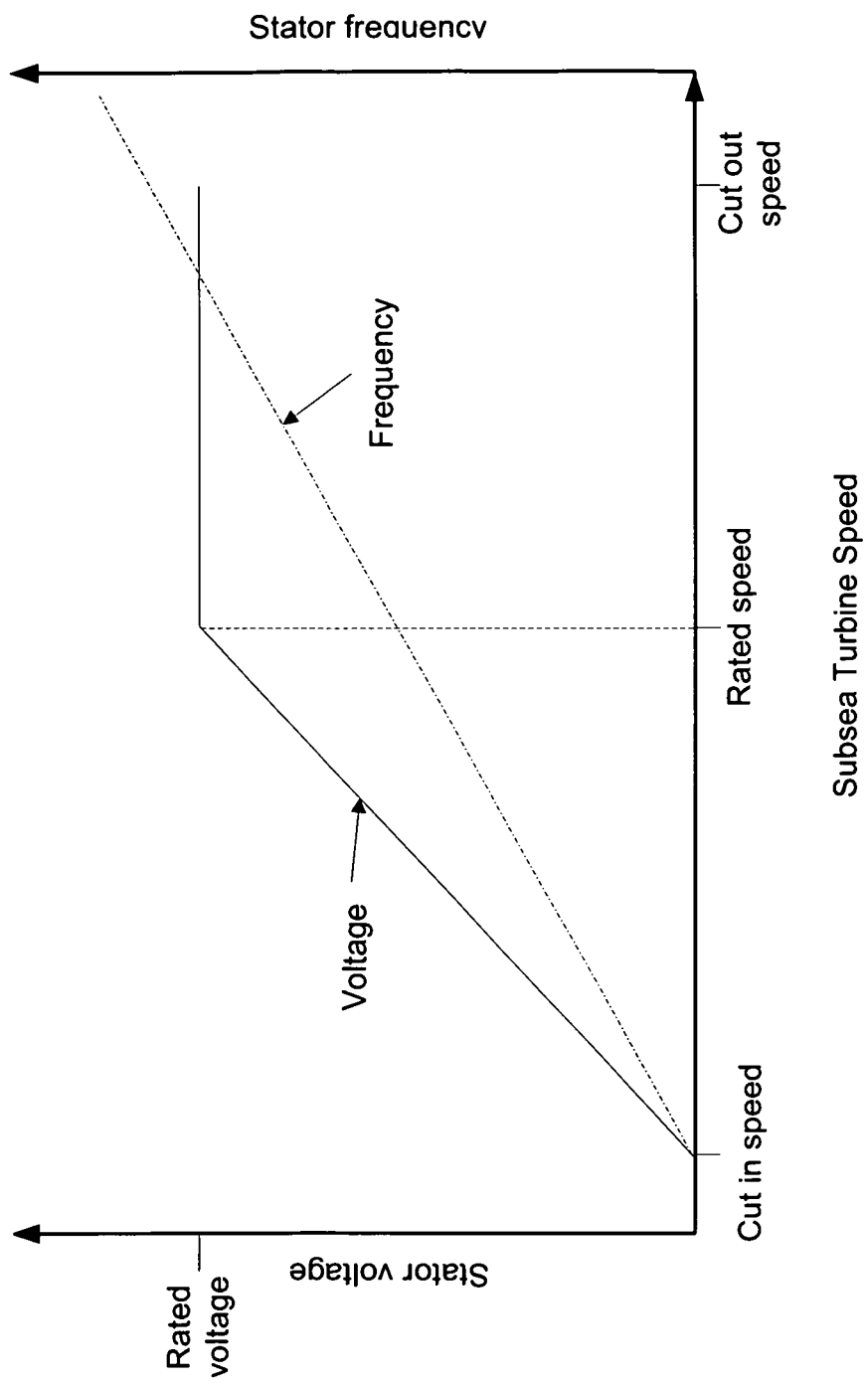
FIG. 2 is a graph of turbine speed against voltage and frequency.

FIG. 2 shows the design rating for the induction generators G1, G2 and G3 in terms of rated speed, rated stator voltage and rated frequency. Typical examples for the design rating might be between 100 to 1000 kW. For any calculated average speed then the desired stator voltage can be determined from the look-up table and the machine bridge controller 28 can control the machine bridge 16 to achieve the desired stator voltage for the generators G1, G2 and G3. The stator voltage and stator frequency are initially zero for an average speed of zero. As the average speed increases then the stator voltage and stator frequency will also increase according to a predetermined relationship. Once the average operating speed reaches the rated speed for the generators then the stator voltage is preferably kept substantially constant at the rated voltage by the machine bridge 16 as shown in FIG. 2. If the average speed increases above the rated speed then the stator frequency will continue to increase.

While the average turbine speed exceeds rated speed, the stator voltage can be kept substantially constant, ideally at the highest magnitude that can be achieved within the ratings of the induction generators and the power converter, and taking into account any voltage drop in the subsea cable 10. The magnitude of the stator frequency will be determined by the point where the power developed by the turbine assembly falls below the power that the associated induction generator and the power converter can export.

It will be readily appreciated that alternative control strategies can be used. One example would include conventional variable voltage variable frequency (VVVF) control which provides a known way of controlling stator voltage for a given stator frequency. The VVVF control strategy might typically use a speed reference to keep Lambda constant where Lambda represents turbine blade tip speed/water speed. A measure of shaft speed is normally provided as part of the VVVF control and can be calculated from stator frequency and generator slip frequency as described above. The water speed can be directly measured by a transducer that is local to the turbine assembly or it can be estimated using generator power, generator speed and the Cp-Lambda curve. The VVVF control strategy might also typically use a stator voltage reference that would be programmed with a profile that compensates for the voltage drop in the subsea cable 10.

A suitable VVVF control strategy would have a speed limit at the rated speed of the induction generators G1, G2 and G3 so that above rated speed it would set a maximum power limit from the generators. This is as required for the power transmission system and enables the induction generators to speed up at a stable point where the turbine power has fallen to within the capability of the associated generator. Clearly, the maximum power set by the VVVF control strategy would depend on the number of induction generators "on-line" at any given time.

What is claimed is:

1. A power transmission system comprising:
   a plurality of renewable-energy turbines connected in parallel to a power converter, each renewable-energy turbine including a turbine assembly and an induction generator; and
   a controller for the power converter;
   wherein the controller uses:
      (i) an indication of the operating speed of one or more of the renewable-energy turbines, and/or
      (ii) an indication of the speed of the fluid flows acting on the turbine assemblies,
   to control the power converter to achieve desired stator electrical quantities at each induction generator to keep the renewable-energy turbines operating substantially at their maximum efficiency.

2. The power transmission system of claim 1, wherein the induction generators are connected to the power converter by means of a single transmission cable.

3. The power transmission system of claim 1, wherein the power converter includes a first active rectifier/inverter having a plurality of semiconductor power switching devices, a second active rectifier/inverter having a plurality of semiconductor power switching devices, and a dc link connected between the first active rectifier/inverter and the second active rectifier/inverter;
   wherein the first active rectifier/inverter is controlled to achieve desired stator electrical quantities at each induction generator.

4. The power transmission system of claim 1, further comprising a dump resistor electrically connected to the dc link to provide a grid fault ride-through capability.

5. The power transmission system of claim 1, further comprising an energy storage device electrically connected to the dc link.

6. A method of operating a power transmission system comprising a plurality of renewable-energy turbines connected in parallel to a power converter, each renewable-energy turbine including a turbine assembly and an induction generator;
   the method comprising the step of using:
      (i) an indication of the operating speed of one or more of the renewable-energy turbines, and/or
      (ii) an indication of the speed of fluid flows acting on the turbine assemblies,
   to control the power converter to achieve desired stator electrical quantities at each induction generator to keep the renewable-energy turbines operating substantially at their maximum efficiency.

7. The method of claim 6, wherein the operating speed of the one or more of the renewable-energy turbines estimated by one or more of the following: (i) an associated encoder or speed sensor that measures rotor speed, (ii) the stator frequency and slip frequency, and (iii) the speed of the fluid flows that are acting on the turbine assembly.

8. The method of claim 6, wherein an average of the estimated operating speeds of all of the renewable-energy turbines is used to calculate the desired stator electrical quantities at each induction generator.

9. The method of claim 6, Wherein the estimated operating speed of just one of the renewable-energy turbines is used to calculate the desired stator electrical quantities at each induction generators.

10. The method of claim 6, wherein a control strategy is used to automatically control the power converter to achieve the desired stator electrical quantities at each induction generator.

11. The method of claim 6, wherein the stator voltage is controlled by the power converter to achieve optimum flux in the induction generators when the indicated operating speed is below a threshold.

12. The method of claim 6, wherein the stator voltage is controlled by the power converter to be substantially constant when the indicated operating speed is above a threshold.

13. The method of claim 12, wherein the stator voltage is controlled by the power converter to be substantially at the rated voltage of the one or more renewable-energy turbines when the indicated operating speed is above the rated speed of the one or more renewable-energy turbines.

14. The method of claim 6, wherein the indicated operating speed of the one or more renewable-energy turbines is used as a pointer to a look-up table to obtain a desired stator voltage, and the power converter is controlled to achieve the desired stator voltage that is obtained from the look-up table.

15. The method of claim 6, wherein the power converter is controlled by variable voltage variable frequency control based on a speed reference calculated from an indication of the speed of the fluid flows acting on the turbine assemblies.

16. The method of claim 15, wherein the speed of the fluid flows acting on the turbine assemblies is estimated by one or more of the following: (i) the generator power of an induction generators and the output frequency of the power converter, (ii) the average generator power of the induction generators and the output frequency of the power converter, and (iii) the output power and the output frequency of the power converter.

* * * * *